(12) United States Patent
Kimbrough

(10) Patent No.: US 6,170,852 B1
(45) Date of Patent: Jan. 9, 2001

(54) TRAILER HITCH ASSEMBLY

(76) Inventor: Alan M. Kimbrough, 209 Warwick Dr., Monroe, LA (US) 71203

(*) Notice: Under 35 U.S.C. 154(b), the term of this patent shall be extended for 0 days.

(21) Appl. No.: 09/260,394

(22) Filed: Mar. 1, 1999

(51) Int. Cl.$^7$ .................................................. B62D 53/00
(52) U.S. Cl. .................................. 280/479.2; 280/479.3; 280/491.2; 280/499
(58) Field of Search ................................ 280/477, 478.1, 280/479.2, 479.3, 491.2, 498, 499, 511

(56) References Cited

U.S. PATENT DOCUMENTS

| | | | |
|---|---|---|---|
| 3,126,210 | * | 3/1964 | Hill . |
| 4,951,957 | * | 8/1990 | Gullickson ........................ 280/479.2 |
| 4,976,453 | * | 12/1990 | Kaplan ............................. 280/479.2 |
| 5,322,315 | * | 6/1994 | Carsten ............................ 280/479.2 |
| 5,342,076 | * | 8/1994 | Swindall .......................... 280/479.3 |
| 5,547,210 | * | 8/1996 | Dugger ................................ 280/477 |
| 5,941,550 | * | 8/1999 | Szczypski ........................ 280/491.2 |

* cited by examiner

Primary Examiner—Anne Marie Boehler

(57) ABSTRACT

A trailer hitch assembly for allowing a user to simultaneously extend and pivot the distal end of the trailer hitch to position the hitch ball in a desired position. The inventive device includes a support frame attachable to a vehicle, a telescoping structure pivotally attached within the support frame, and a spring-loaded locking pin attached to the support frame for selectively engaging the telescoping structure for preventing extension and pivoting movement. The telescoping structure comprises a receiver member pivotally attached within the support frame, an extending member slidably positioned within the receiver member for supporting a conventional hitch ball, a lock aperture within the extending member for catchably receiving the locking pin, at least one guide slot within the receiver member, and at least one guide pin for sliding within the at least one guide slot. A pair of stopper members are preferably secured to the perimeter of the extending member for engaging the edge of the receiver member thereby preventing damage to the locking pin. A wear plate is preferably attached to a lower plate of the support frame for providing a reduced friction surface for the receiver member to pivot upon. A wear liner is preferably within the lumen of the receiver member for providing a reduced friction surface for the extending member to extend inwardly and outwardly upon. The locking pin preferably includes a handle for allowing the user to grasp manually. A pair of wing members are attached to the receiver member for preventing the locking pin from extending beside the receiver member during pivoting of the receiver member.

6 Claims, 3 Drawing Sheets

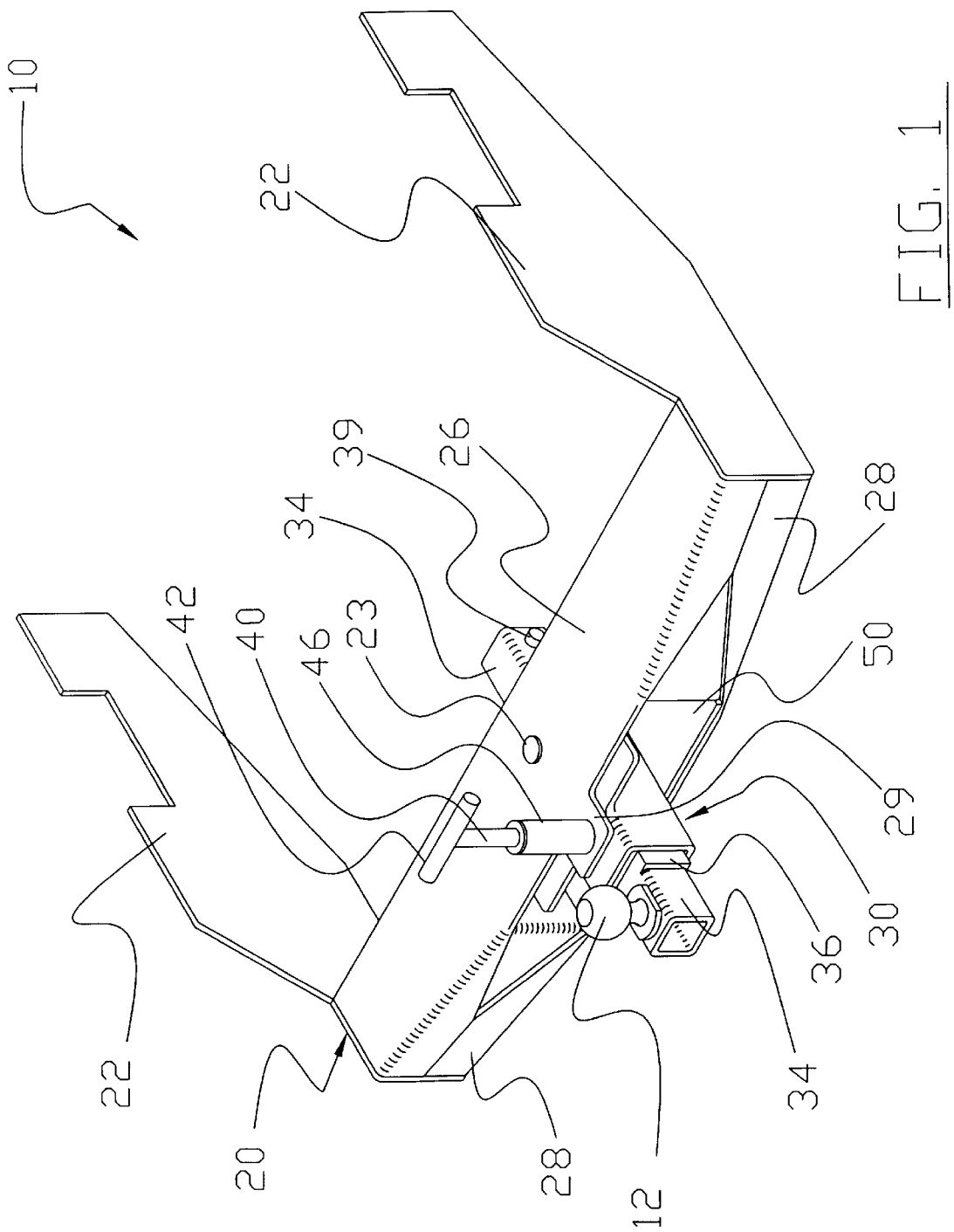

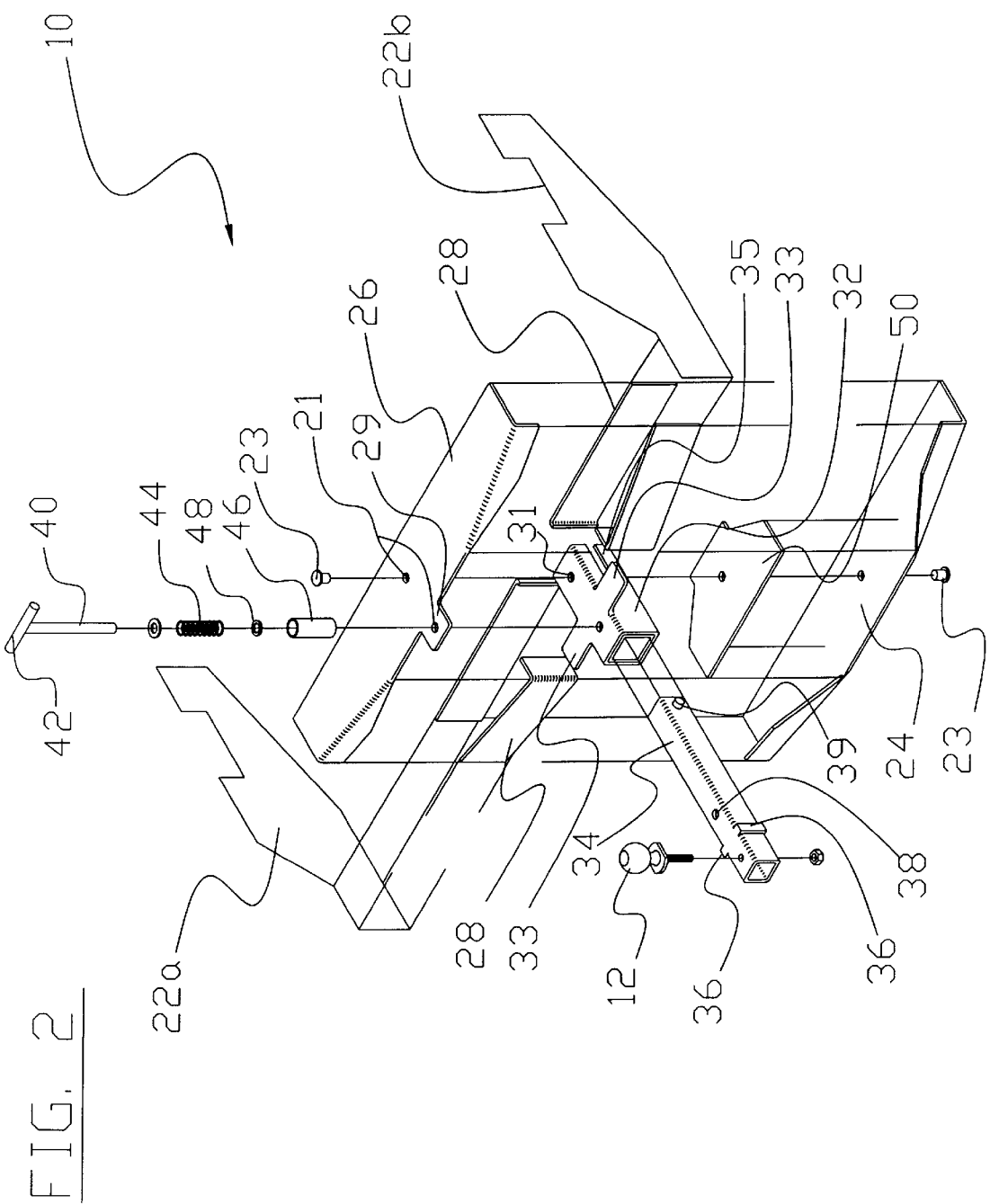

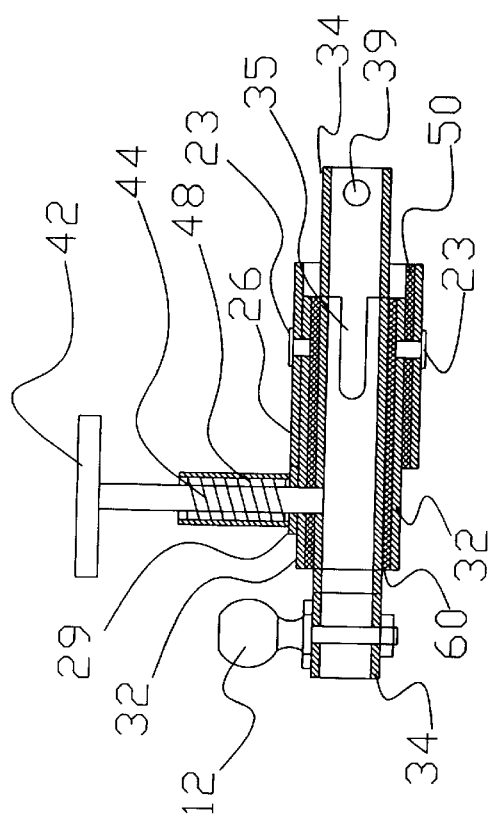
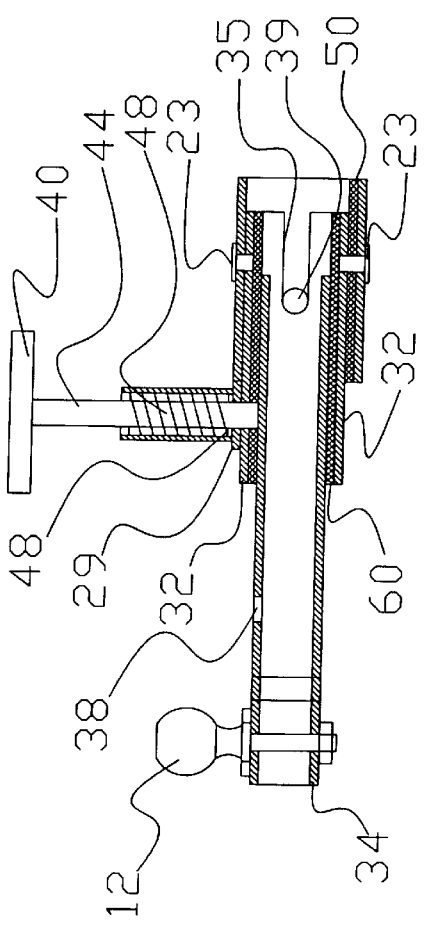

TRAILER HITCH ASSEMBLY

BACKGROUND OF THE INVENTION

1. Field of the Invention

The present invention relates generally to trailer hitches and more specifically it relates to a trailer hitch assembly for allowing a user to simultaneously extend and pivot the distal end of the trailer hitch to position the hitch ball in a desired position.

Individuals that own trailers, whether they be horse or boat trailers, must always go through the difficult task of aligning and connecting the hitch ball of the trailer hitch to a ball coupler on the trailer. Since the user is usually unable to directly visualize the hitch ball and the ball coupler during movement of the vehicle, the user must constantly stop the vehicle and get out to determine the position and distance the hitch ball is from the ball coupler. Sometimes the user will back up too much causing the ball coupler to damage the rear portion of the vehicle. Hence, there is a need for a device that will allow a user to easily and simply connect a hitch ball to a ball coupler without having to inconveniently get out of the vehicle numerous times.

2. Description of the Prior Art

Trailer hitches have been in use for years. Typically, the trailer hitch is directly connected to the bumper of the vehicle preventing any longitudinal or pivotal movement of the trailer hitch. The conventional trailer hitch will have a hitch shaft with a hitch ball removably attached through an aperture within the distal end of the hitch shaft.

Conventional trailer hitches do not allow longitudinal or pivotal movement for allowing the user to manually align the hitch ball with the ball coupler. Because the user has to constantly "guess" where the position of the ball coupler is in relation to the rear portion of the vehicle, damage to the vehicle is all but inevitable. In addition, it is extremely dangerous for the user to accidentally engage the trailer which can result in uncontrolled movement of the trailer.

Examples of trailer hitches include U.S. Pat. No. 4,944,525 to Laundry; U.S. Pat. No. 5,547,210 to Dugger; U.S. Pat. No. 5,727,805 to La Roque; and U.S. Pat. No. 5,342,076 to Swindall are all illustrative of such prior art.

Laundry (U.S. Pat. No. 4,944,525) discloses a self locking trailer hitch. Laundry teaches a frame attachable to a vehicle, a housing arranged to slide longitudinally on the frame, and a swing bar pivotally attached to the housing to swing laterally.

Dugger (U.S. Pat. No. 5,547,210) discloses a trailer hitch for a vehicle designed to be inserted in a conventional square-shaped sleeve or receiver fixed to the back of a vehicle. Dugger teaches a sleeve and an arm which is received by and pivots simultaneously with the sleeve.

La Roque (U.S. Pat. No. 5,727,805) discloses an adjustably extensible trailer hitch assembly. La Roque teaches a base structure attachable to a vehicle, an outer tube pivotally attached to the base structure, an inner shaft slidably positioned within the outer tube, a lock pin insertable through the outer tube and the inner shaft for securing the extended position, and a U-shaped pivot clamp pivotally attached to the base structure for removably surround the sides of the outer tube for preventing pivoting.

While these devices may be suitable for the particular purpose to which they address, they are not as suitable for allowing a user to simultaneously extend and pivot the distal end of the trailer hitch to position the hitch ball in a desired position. The prior art attempts require the user to remove two securing devices for preventing the extending and pivoting movements of the trailer hitch which are awkward to utilize.

In these respects, the trailer hitch assembly according to the present invention substantially departs from the conventional concepts and designs of the prior art, and in so doing provides an apparatus primarily developed for the purpose of allowing a user to simultaneously extend and pivot the distal end of the trailer hitch to position the hitch ball in a desired position.

SUMMARY OF THE INVENTION

In view of the foregoing disadvantages inherent in the known types of trailer hitches now present in the prior art, the present invention provides a new trailer hitch assembly construction wherein the same can be utilized for allowing a user to simultaneously extend and pivot the distal end of the trailer hitch to position the hitch ball in a desired position.

The general purpose of the present invention, which will be described subsequently in greater detail, is to provide a new trailer hitch assembly that has many of the advantages of the trailer hitches mentioned heretofore and many novel features that result in a new trailer hitch assembly which is not anticipated, rendered obvious, suggested, or even implied by any of the prior art trailer hitches, either alone or in any combination thereof.

To attain this, the present invention generally comprises a support frame attachable to a vehicle, a telescoping structure pivotally attached within the support frame, and a spring-loaded locking pin attached to the support frame for selectively engaging the telescoping structure for preventing extension and pivoting movement. The telescoping structure comprises a receiver member pivotally attached within the support frame, an extending member slidably positioned within the receiver member for supporting a conventional hitch ball, a lock aperture within the extending member for catchably receiving the locking pin, at least one guide slot within the receiver member, and at least one guide pin for sliding within at least one guide slot. A pair of stopper members are preferably secured to the perimeter of the extending member for engaging the edge of the receiver member thereby preventing damage to the locking pin. A wear plate is preferably attached to a lower plate of the support frame for providing a reduced friction surface for the receiver member to pivot upon. A wear liner is preferably within the lumen of the receiver member for providing a reduced friction surface for the extending member to extend inwardly and outwardly upon. The locking pin preferably includes a handle for allowing the user to grasp manually. A pair of wing members are attached to the receiver member for preventing the locking pin from extending beside the receiver member during pivoting of the receiver member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trailer hitch assembly that will overcome the shortcomings of the prior art devices.

Another object is to provide a trailer hitch assembly that allows the user simultaneously release the extension and pivoting portions.

An additional object is to provide a trailer hitch assembly that has a reduced number of components thereby reducing susceptibility to breakage.

A further object is to provide a trailer hitch assembly that is capable of being extended and pivoted simultaneously.

Another object is to provide a trailer hitch assembly that reduces the number of times the user must leave the vehicle to monitor the location of the vehicle in respect to the ball coupler of the trailer.

A further object is to provide a trailer hitch assembly that does not utilize a hinge pin that would obstruct the sliding movement.

Another object is to provide a trailer hitch assembly that utilizes a wear resistant and replaceable material between moving component for reducing friction and wear.

A further object is to provide a trailer hitch assembly that is constructed to prevent damage to the lock pin during forward movement of the trailer with respect to the vehicle.

Another object is to provide a trailer hitch assembly that is attachable to most designs and makes of vehicles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is an upper perspective view of the present invention.

FIG. 2 is an exploded upper perspective view of the present invention.

FIG. 3 is a side cutaway view showing the present invention in the locked position preventing any extension or pivot movements of the trailer hitch.

FIG. 4 is a side cutaway view showing the present invention in the released position allowing simultaneous extension and pivot movements of the trailer hitch.

DESCRIPTION OF THE PREFERRED EMBODIMENT

Turning now descriptively to the drawings, in which similar reference characters denote similar elements throughout the several view, FIGS. 1 through 4 illustrate a trailer hitch assembly 10, which comprises a support frame 20 attachable to a vehicle, a telescoping structure 30 pivotally attached within the support frame 20, and a spring-loaded locking pin 40 attached to the support frame 20 for selectively engaging the telescoping structure 30 for preventing extension and pivoting movement. The telescoping structure 30 comprises a receiver member 32 pivotally attached within the support frame 20, an extending member 34 slidably positioned within the receiver member 32 for supporting a conventional hitch ball 12, a lock aperture 38 within the extending member 34 for catchably receiving the locking pin 40, at least one guide slot 35 within the receiver member 32, and at least one guide pin 39 for sliding within the at least one guide slot 35. A pair of stopper members 36 are preferably secured to the perimeter of the extending member 34 for engaging the edge of the receiver member 32 thereby preventing damage to the locking pin 40. A wear plate 50 is preferably attached to a lower plate 24 of the support frame 20 for providing a reduced friction surface for the receiver member 32 to pivot upon. A wear liner 60 is preferably within the lumen of the receiver member 32 for providing a reduced friction surface for the extending member 34 to extend inwardly and outwardly upon. The locking pin 40 preferably includes a handle 42 for allowing the user to grasp manually. A pair of wing members 33 are attached to the receiver member 32 for preventing the locking pin 40 from extending beside the receiver member 32 during pivoting of the receiver member 32.

As best shown in FIGS. 1 and 2, the support frame 20 comprises a pair of side members 22, an upper plate 26 attached between the side members 22, a lower plate 24 attached between the side members 22, and a plurality of walls 28 for substantially enclosing the support frame 20 except for a front and rear opening that receives the telescoping structure 30.

As shown in FIGS. 1 through 4, a tongue member 29 extends from the upper plate 26 a finite distance and includes a frame aperture 21 for receiving the locking pin 40. A tube 46 is attached to the upper plate 26 about the frame aperture 21 as best shown in FIGS. 3 and 4 of the drawings. As shown in FIG. 2 of the drawings, a washer 41 is secured to the upper opening of the tube 46 for slidably receiving the locking pin 40.

As shown in FIGS. 2 through 4, a cincture 48 surrounds the lower portion of the locking pin 40. A compression spring 44 is compressibly positioned between the washer 41 and the cincture 48 thereby applying a constant downward force against the locking pin 40. A handle 42 is preferably attached to the upper end of the locking pin 40 as shown in FIGS. 1 through 4 of the drawings for allowing the user to manually manipulate the locking pin 40 along a vertical path.

As shown in FIGS. 1 through 4, the telescoping structure 30 comprises a receiver member 32 and an extending member 34. The receiver member 32 is pivotally attached between the upper plate 26 and the lower plate 24 by a pair of hinge pins 23 inserted through frame aperture 21 within the lower plate 24 and upper plate 26 as best shown in FIG. 2 of the drawings. A pair of hinge apertures 31 within the receiver member 32 rotatably receive the pair of opposing hinge pins 23 as shown in FIGS. 2 through 4 of the drawings.

As shown in FIG. 2 of the drawings, a wear plate 50 is preferably attached between the lower plate 24 and the receiver member 32 for reducing friction and reducing wear to the receiver member 32 and the lower plate 24. The wear plate 50 is preferably constructed of conventional UHMW material or other well-known friction resistant material.

As shown in FIGS. 2 through 4, a wear liner 60 is preferably positioned within the lumen of the receiver member 32 for reducing friction and reducing wear to the receiver member 32 and the extending member 34. The wear liner 60 is preferably constructed of conventional UHMW material or other well-known friction resistant material. As shown in FIGS. 3 and 4 of the drawings, the wear liner 60 has an inner perimeter greater than the outer perimeter of the extending member 34.

As best shown in FIGS. 3 and 4, the extending member 34 is slidably positioned within the receiver member 32 for allowing extension and contraction of the extending member 34. As shown in FIGS. 1 through 4, a conventional hitch ball 12 is attachable to the distal end of the extending member 34.

As best shown in FIGS. 2 through 4 of the drawings, the extending member 34 has a lock aperture 38 for removably receiving the locking pin 40. This lock aperture 38 extends through the receiver member 32 as shown in FIG. 2 of the drawings to receive the locking pin 40 when in the locked position. The extending member 34 further includes a guide pins 39 on opposing sides of the extending member 34 opposite of the conventional hitch ball 12 as shown in FIGS. 2 through 4.

As shown in FIG. 4, the pair of guide pins 39 are slidably positionable within a pair of corresponding guide slots 35 within the receiver member 32. The guide slots 35 extend from the rear of the receiver member 32 inwardly a finite distance along the longitudinal axis of the receiver member 32. The guide slots 35 terminate thereby limiting the length of travel for the extending member 34 when the locking pin 40 is released.

As best shown in FIG. 2, the extending member 34 preferably has at least two stopper members 36 secured about the extending member 34 for limiting the inward travel of the extending member 34 during connection to a conventional trailer. The stopper members 36 prevent damage to the locking pin 40 by absorbing a majority of the forces associated with a vehicle backing into and engaging the trailer.

As shown in FIGS. 1 and 2 of the drawings, a pair of wing members 33 are secured to the receiver member 32 on opposing sides. The pair of wing members 33 prevent the locking pin 40 from extending adjacent to a side portion of the receiver member 32 during pivoting of the receiver member 32. The pair of wing members 33 reduce the amount of labor required by the user during connection of the vehicle to the trailer.

In use, the user positions the rear portion of the vehicle near the conventional trailer to be connected. When the hitch ball 12 is sufficiently close to the ball coupler of the conventional trailer, the user stops and exits the vehicle. The user then manipulate the locking pin 40 to be released from the lock aperture 38 within both the extending member 34 and the receiver member 32. The user then may pivot and extend the telescoping structure 30 so as to position the hitch ball 12 directly beneath the conventional ball coupler of the trailer. When properly positioned, the user then lowers the trailer so that the ball coupler mates with the hitch ball 12 and the user then locks the ball coupler about the hitch ball 12. The user then enters the vehicle again and slowly drives straight forward to align the lock aperture 38 within the receiver member 32 with the locking pin 40 thereby causing the locking pin 40 to enter the lock aperture 38 within the receiver for preventing pivoting of the telescoping structure 30 as shown in FIG. 4. The user then stops and redirects the travel of the vehicle rearwardly toward the trailer so as to slide the extending member 34 inwardly with the locking pin 40 sliding upon an upper surface of the extending member 34. When the lock aperture 38 within the extending member 34 is aligned with the locking pin 40, the locking pin 40 extends further into the extending member 34 through the lock aperture 38 thereby preventing extending of the telescoping structure 30. As the locking pin 40 extends into the extending member 34, the stopper members 36 engage the outer perimeter of the receiver member 32 thereby preventing any significant side forces from being incurred by the locking pin 40. The user is then able to drive with the trailer securely attached without fear of movement of the telescoping structure 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Trailer Hitch Assembly
ENVIRONMENTAL ELEMENTS

| | |
|---|---|
| 10. Trailer Hitch Assembly | 40. Locking Pin |
| 11. | 41. Washer |
| 12. Ball Hitch | 42. Handle |
| 13. | 43. |
| 14. | 44. Compression Spring |
| 15. | 45. |
| 16. | 46. Tube |
| 17. | 47. |
| 18. | 48. Cincture |
| 19. | 49. |
| 20. Support Frame | 50. Wear Plate |
| 21. Frame Aperture | 51. |
| 22. Side Members | 52. |
| 23. Hinge Pins | 53. |
| 24. Lower Plate | 54. |
| 25. | 55. |
| 26. Upper Plate | 56. |
| 27. | 57. |
| 28. Walls | 58. |
| 29. Tongue Member | 59. |
| 30. Telescoping Structure | 60. Wear Liner |
| 31. Hinge Aperture | 61. |
| 32. Receiver Member | 62. |
| 33. Wing Members | 63. |
| 34. Extending Member | 64. |
| 35. Guide Slot | 65. |
| 36. Stopper Members | 66. |

| Index of Elements for Trailer Hitch Assembly ENVIRONMENTAL ELEMENTS | |
|---|---|
| 37. | 67. |
| 38. Lock Aperture | 68. |
| 39. Guide Pin | 69. |
| | 70. |
| | 71. |
| | 72. |
| | 73. |
| | 74. |
| | 75. |
| | 76. |
| | 77. |
| | 78. |
| | 79. |

I claim:

1. A trailer hitch assembly, comprising:

a support frame having a lower portion and an upper portion attachable to a vehicle;

a telescoping structure pivotally attached to said support frame, wherein a hitch ball is attachable to said telescoping structure;

a wear plate positioned between said telescoping structure and said lower portion of said support frame; and a locking means attached to said upper portion of said support frame and engageable with said telescoping structure for allowing a user to simultaneously lock/release an extending movement and a pivoting movement of said telescoping structure;

wherein said telescoping structure comprises:

a receiver member pivotally attached within said support frame; and an extending member slidably positioned within said receiver member;

wherein said locking means comprises a locking pin extendible through a lock aperture within said receiver member and said extending member, wherein said locking pin extends downwardly into said telescoping structure from an upper vertical position through said upper portion of said support frame;

a pair of wing members attached to an upper surface of said receiver member for preventing the locking pin from extending adjacent said receiver member when said receiver member is rotated within said support frame.

2. The trailer hitch assembly of claim 1, wherein said receiver member is pivotally attached with said support frame by a pair of opposing hinge pins that do not extend into the interior portion of said receiver member.

3. The trailer hitch assembly of claim 2, including a spring means attached to said locking pin, wherein said spring means forces said locking pin downwardly toward said receiver member and said extending member.

4. The trailer hitch assembly of claim 1, wherein said extending member includes a pair of stopper members for limiting the inward travel of said extending member.

5. The trailer hitch assembly of claim 4, wherein:

said receiver member includes at least one guide slot; and said extending member includes at least one guide pin that is engageable within said at least one guide slot for limiting the extension of said extending member.

6. The trailer hitch assembly of claim 1, including a wear liner within a lumen of said receiver member.

* * * * *